(12) United States Patent
Coaplen et al.

(10) Patent No.: US 12,128,983 B2
(45) Date of Patent: *Oct. 29, 2024

(54) CROWN AIR VOLUME

(71) Applicant: Fox Factory, Inc., Duluth, GA (US)

(72) Inventors: Joshua Coaplen, Asheville, NC (US); Christopher Otterness, Asheville, NC (US); Daniel McCormick, Mills River, NC (US)

(73) Assignee: Fox Factory, Inc., Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/230,870

(22) Filed: Aug. 7, 2023

(65) Prior Publication Data

US 2024/0025510 A1 Jan. 25, 2024

Related U.S. Application Data

(63) Continuation of application No. 17/158,837, filed on Jan. 26, 2021, now Pat. No. 11,718,362.

(60) Provisional application No. 62/968,905, filed on Jan. 31, 2020.

(51) Int. Cl.
*B62K 21/04* (2006.01)
*B62K 25/04* (2006.01)
*B62K 25/08* (2006.01)

(52) U.S. Cl.
CPC .............. *B62K 21/04* (2013.01); *B62K 25/08* (2013.01); *B62K 2025/044* (2013.01); *B62K 2025/048* (2013.01); *B62K 2201/08* (2013.01)

(58) Field of Classification Search
CPC ................ B62K 21/04; B62K 2201/08; B62K 2025/048; B62K 2025/044
See application file for complete search history.

(56) References Cited

U.S. PATENT DOCUMENTS

| | | | |
|---|---|---|---|
| 5,626,355 A | 5/1997 | Voss et al. | |
| 5,725,226 A | 3/1998 | Cabrerizo-Pariente et al. | |
| 6,095,542 A | 8/2000 | Allen | |
| 7,222,869 B2 | 5/2007 | Chen | |
| 8,770,609 B2 | 7/2014 | Dodman et al. | |
| 11,718,362 B2 * | 8/2023 | Coaplen | B62K 21/04 280/276 |
| 2006/0186632 A1 * | 8/2006 | Chen | B62K 21/04 280/276 |
| 2011/0121525 A1 * | 5/2011 | Shirai | F16F 13/002 280/5.515 |
| 2022/0318444 A1 | 10/2022 | Coaplen et al. | |

* cited by examiner

Primary Examiner — Kevin Hurley
Assistant Examiner — Hosam Shabara

(57) ABSTRACT

A crown assembly including at least one crown fluid chamber having a first volume, and a fork side opening for fluidly coupling the at least one crown fluid chamber with at least one fluid spring chamber of a fork leg to provide an additional amount of available fluid volume to the at least one fluid spring chamber.

18 Claims, 8 Drawing Sheets

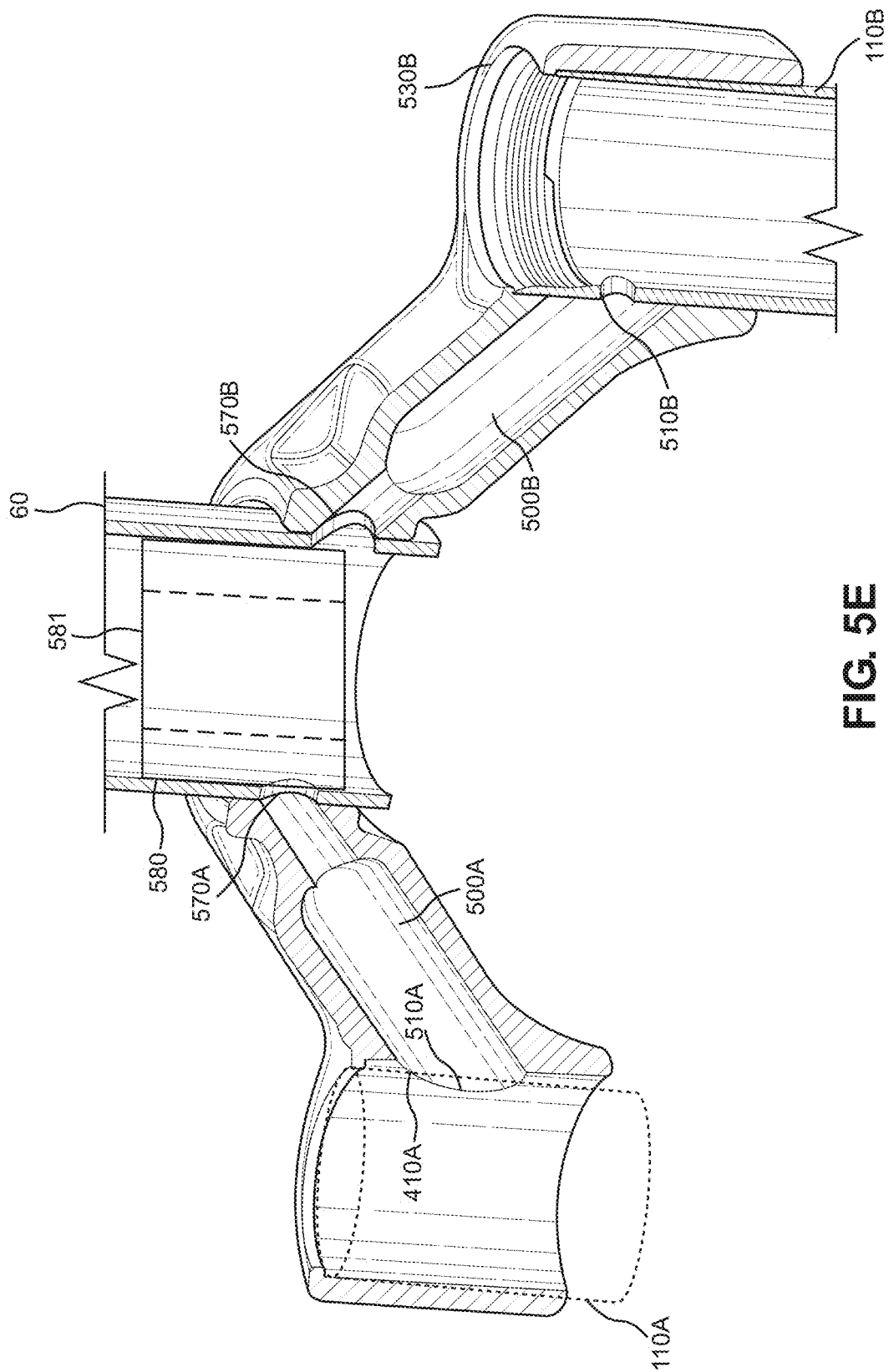

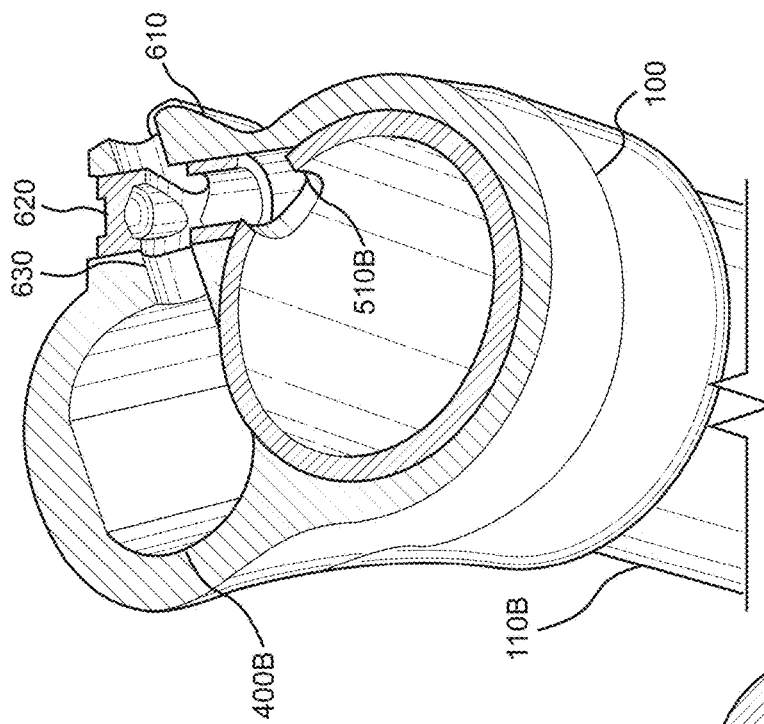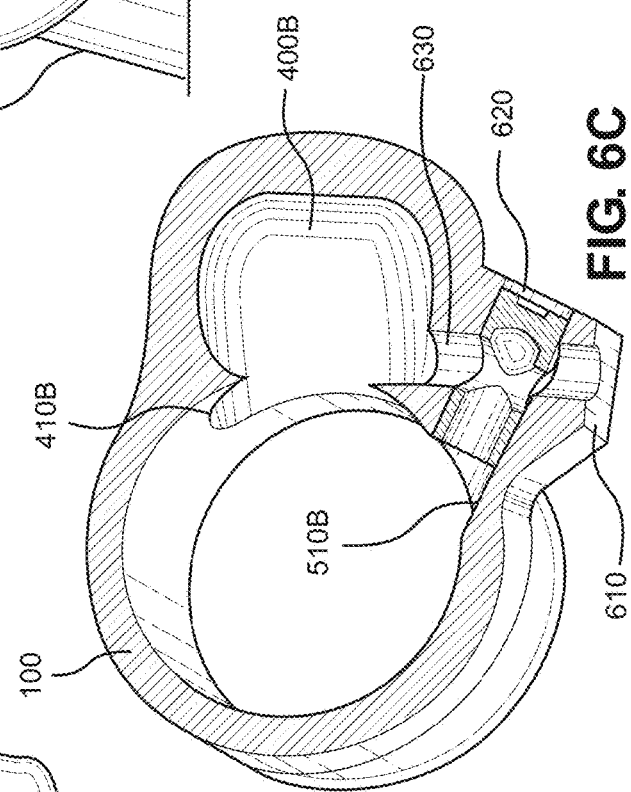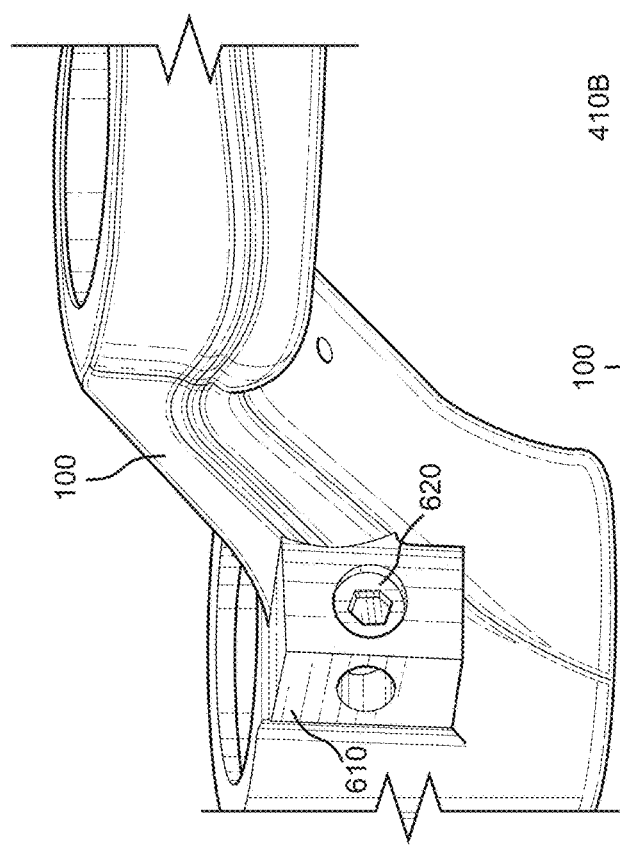

CROWN AIR VOLUME

CROSS-REFERENCE TO RELATED APPLICATIONS

This application claims priority to and benefit of co-pending U.S. patent application Ser. No. 17/158,837 filed on Jan. 26, 2021, now U.S. Issued U.S. Pat. No. 11,718,362, entitled "CROWN AIR VOLUME" by Coaplen et al., and assigned to the assignee of the present application, the disclosure of which is hereby incorporated by reference in its entirety.

The application Ser. No. 17/158,837 claims priority to and benefit of U.S. Provisional Patent Application No. 62/968,905 filed on Jan. 31, 2020, entitled "CROWN AIR VOLUME" by Coaplen et al., and assigned to the assignee of the present application, the disclosure of which is hereby incorporated by reference in its entirety.

FIELD OF THE INVENTION

Embodiments of the present technology relate generally to a crown portion of a fork assembly.

BACKGROUND

Presently, the ability to adjust performance characteristics in an air spring portion of a suspension are an ongoing challenge. These challenges include the effect of different environments, vehicles, performance requirements, rider skill level, rider comfort requirements, available use area on the particular suspension, and the like. Moreover, the transition between different vehicle uses, e.g., downhill versus uphill, road versus gravel versus off-road, etc. can drive the need for different air spring suspension characteristics based on the ride, based on the bike, to be modifiable during the ride, etc.

BRIEF DESCRIPTION OF THE DRAWINGS

Aspects of the present invention are illustrated by way of example, and not by way of limitation, in the accompanying drawings, wherein:

FIG. 5E is a cutaway view of a crown with one or more crown fluid holes coupled with an upper fork tube and a steerer tube with a fluid chamber therein, in accordance with an embodiment.

FIG. 6A is a side view of crown with a switch including a moveable portion, in accordance with an embodiment.

FIG. 6B is an orthogonal cutaway view of a crown with a switch, in accordance with an embodiment.

FIG. 6C is a top cutaway view of a crown with a switch, in accordance with an embodiment.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

As stated above, in some vehicles, a steerer tube is ultimately coupled to a wheel of a vehicle via a crown and a fork leg. For purposes of brevity and clarity, the following discussion will refer to embodiments of the present invention corresponding to the crown and the fork leg. It should be noted, however, that various embodiments of the present invention are well suited for use in a fork assembly having a single fork leg and/or a fork assembly having two fork legs.

As will be described in detail below, embodiments of the present invention provide a heretofore nonexistent fluid chamber having an air volume located at a crown portion of a fork assembly.

Figure 1:
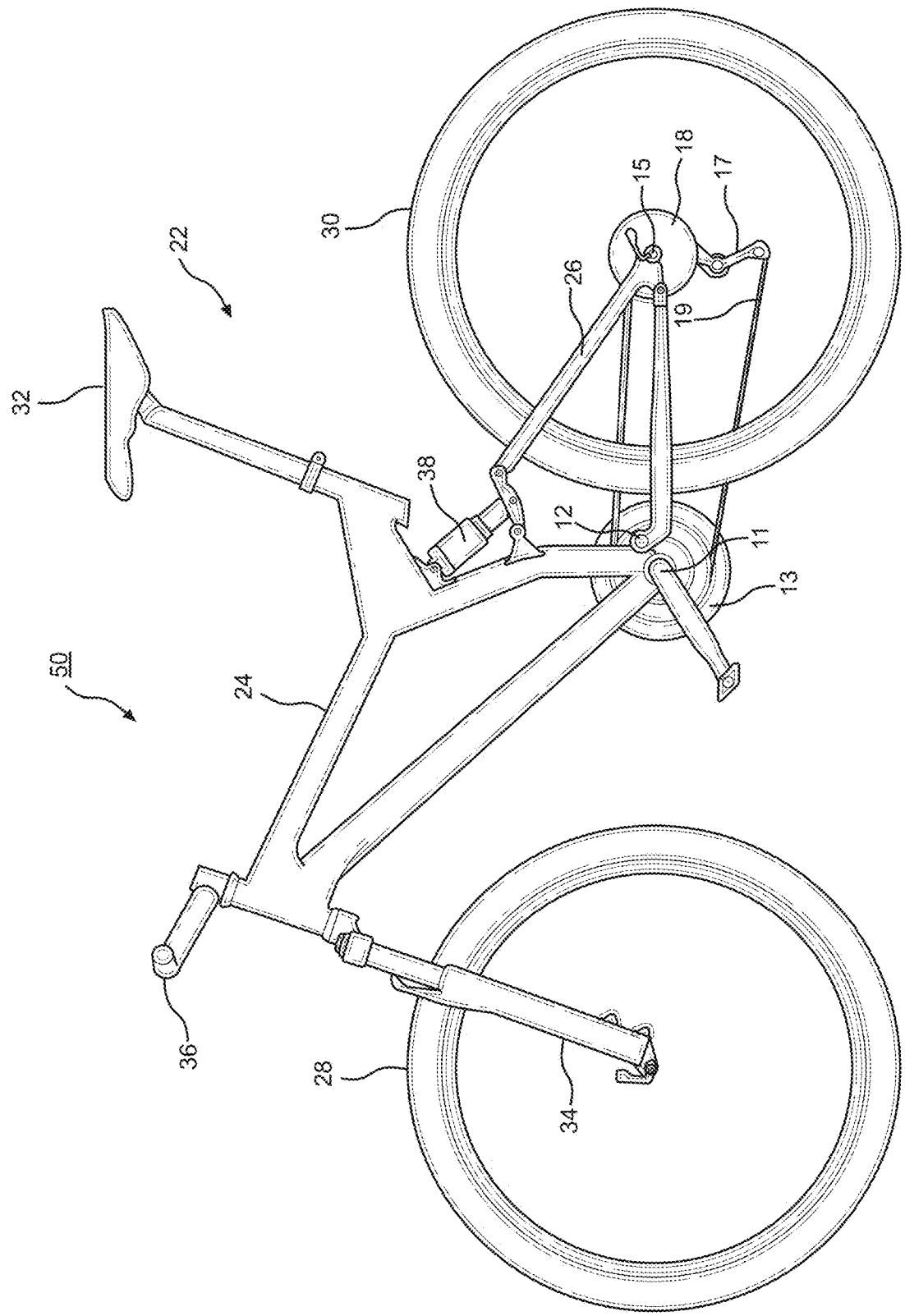
FIG. 1 is a perspective view of a bicycle having an air spring, in accordance with an embodiment.

Referring now to FIG. 1, a perspective view of a bicycle 50 having an air spring, shown in accordance with an embodiment. Bicycle 50 includes a main frame 24 with a suspension system comprising a swing arm portion 26 that, in use, is able to move relative to the rest of main frame 24; this movement is permitted by, inter alia, a rear shock 38. The front fork 34 also provides a suspension function via a damping assembly in at least one fork leg; as such the bicycle 50 is a full suspension bicycle (such as an MTB or mountain bike), although the embodiments described herein are not limited to use on full suspension bicycles.

In general, the term "suspension system" is intended to include vehicles having front suspension, rear suspension, or both front and rear suspension. In one embodiment, swing arm portion 26 is pivotally attached to the main frame 24 at pivot point 12 which is located above the bottom bracket axis 11. Although pivot point 12 is shown in a specific location, it should be appreciated that pivot point 12 can be found at different distances from bottom bracket axis 11 depending upon the rear suspension configuration. In one embodiment, the use and/or location of the pivot point 12 as shown herein is provided for purposes of clarity. Bottom bracket axis 11 is the center of the pedal and front sprocket assembly 13. Bicycle 50 includes a front wheel 28 which is coupled to the main frame 24 via front fork 34 and a rear wheel 30 which is coupled to the main frame 24 via swing arm portion 26. A seat 32 is connected to the main frame 24 in order to support a rider of the bicycle 50.

The front wheel 28 is supported by front fork 34 which, in turn, is secured to the main frame 24 by a handlebar assembly 36. The rear wheel 30 is connected to the swing arm portion 26 of the frame 22 at rear wheel axis 15. A rear shock 38 is positioned between the swing arm portion 26 and the main frame 24 to provide resistance to the pivoting motion of the swing arm portion 26 about pivot point 12. Thus, the illustrated bicycle 50 includes a suspension member between swing arm portion 26 and the main frame 24 which operate to substantially reduce rear wheel 30 impact forces from being transmitted to the rider of the bicycle 50.

Bicycle 50 is driven by a chain 19 that is coupled with both front sprocket assembly 13 and rear sprocket 18. As the rider pedals the front sprocket assembly 13 is rotated about bottom bracket axis 11 a force is applied to chain 19 which transfers the energy to rear sprocket 18. Chain tension device 17 provides a variable amount of tension on chain 19.

In one embodiment, the air spring assembly is located within the front fork 34. Although the following discussion refers to the air spring assembly in context of a bicycle, and specifically in the front fork 34 of the bicycle, it should be appreciated that the air spring assembly could be used in different suspensions and in different vehicles such as, but not limited to a bicycle, motorcycle, ATV, jet ski, car, etc. Moreover, although a number of components are shown in the disclosed figures, it should be appreciated that one or more of the components of the air spring assembly could be fixed or could be interchangeable. Further, one or more of the components could be adjusted, modified, removed, added, or exchanged for personal reasons, for performance reasons, for different applications (e.g., road, downhill, offroad, uphill, etc.), for different vehicles, and the like.

Figure 2:
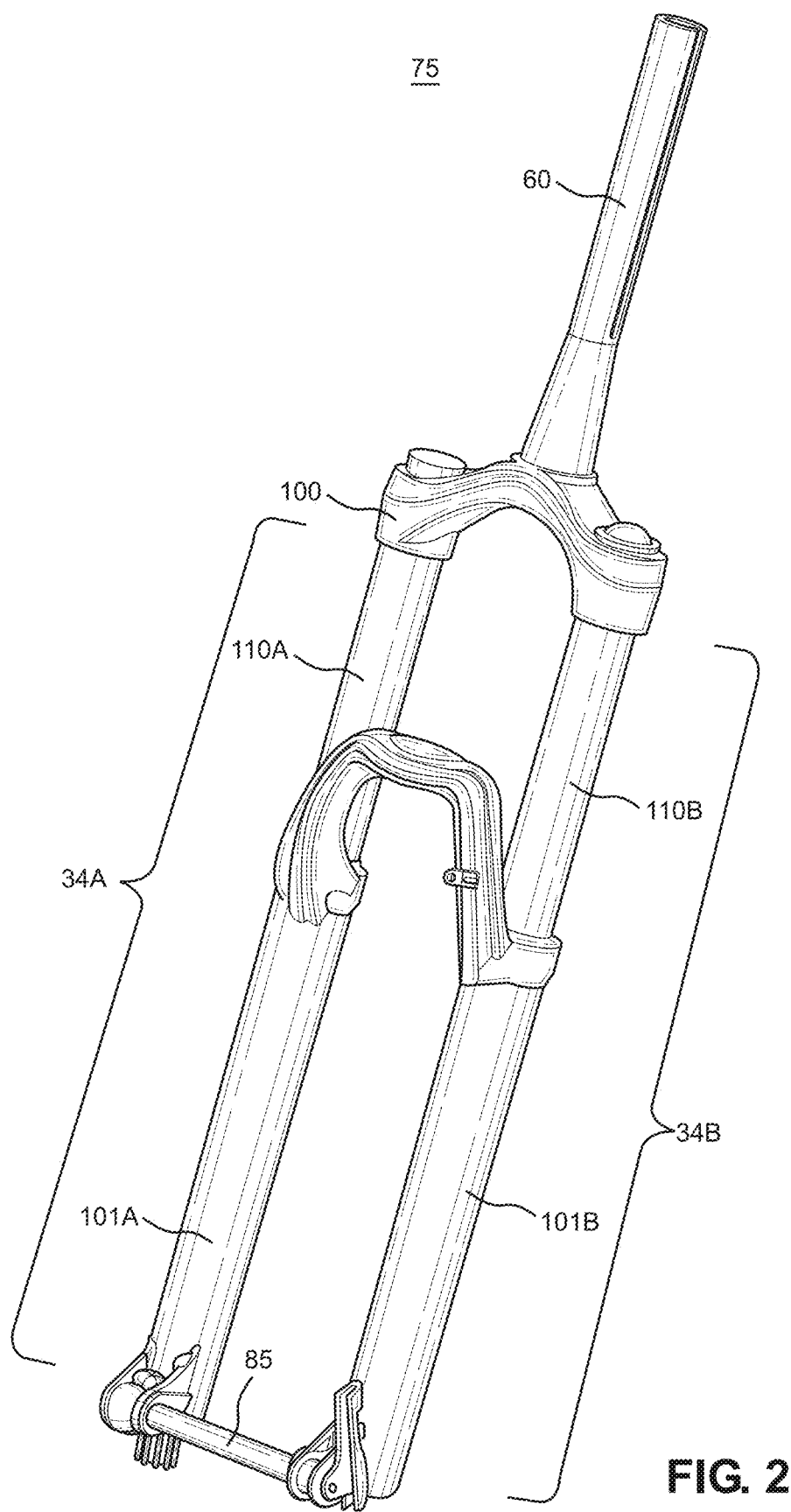
FIG. 2 is a perspective view of a fork assembly including a steerer tube, a crown, and a fork, in accordance with an embodiment.

Referring now to FIG. 2, a perspective view of coupled with fork assembly 75 is shown in accordance with an embodiment. In one embodiment, fork assembly 75 includes a steerer tube 60, a crown 100, a fork leg 34a, and a fork leg 34b. An axle 85 is shown at the lower portion of the fork assembly 75. The axle 85 would be placed through the center of a front wheel and about which the front wheel rotates. In one embodiment, e.g., a duel legged fork setup, axle 85 is removably coupled to fork leg 34a and fork leg 34b, thereby coupling the front wheel to the fork assembly 75.

In one embodiment, fork leg 34a includes an upper fork tube 110a and a lower fork tube 101a telescopically coupled together to form a fork fluid chamber. In one embodiment, fork leg 34a includes a damper within the fork fluid chamber. In one embodiment, fork leg 34b includes an upper fork tube 110b and a lower fork tube 101b telescopically coupled together to form a fork leg with a fork fluid chamber. In one embodiment, fork leg 34a includes an air spring assembly within the fork fluid chamber.

Although FIG. 2 shows two fork legs, e.g., 34a and 34b, coupled with crown 100, in one embodiment, there may only be a single leg coupled with crown 100. In one embodiment, the fork(s) are fixedly coupled with the crown during the assembly process. Thus, the fork(s) would be aligned with the crown 100 at the time of assembly. In one embodiment, one, some, or all of the forks and crown 100 could be metal, composite, could be built as a single composite component, could be a single piece-metal form, or the like.

Figure 3:
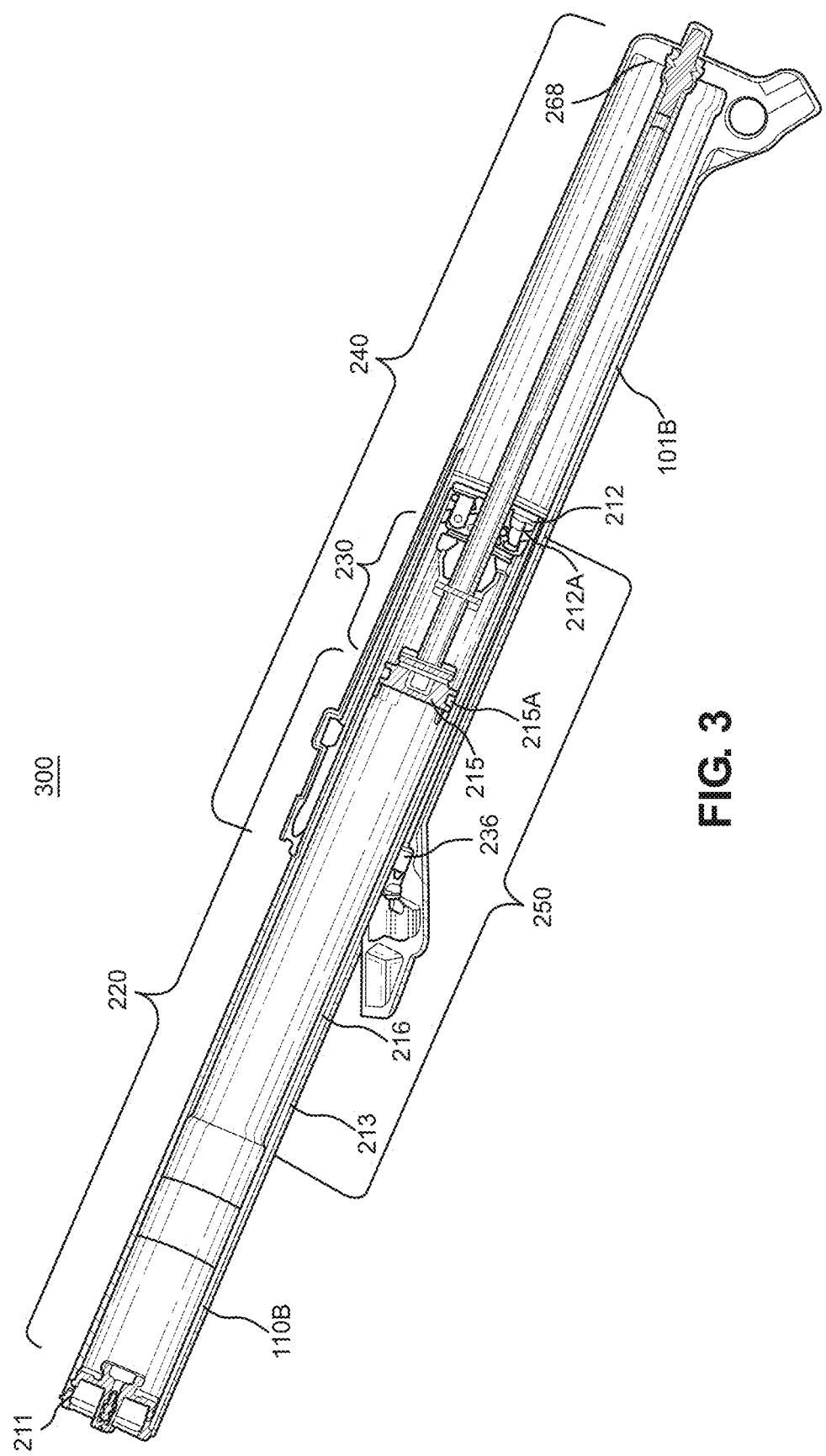
FIG. 3 is a cross-sectional view of an exemplary air spring assembly found in a fork, in accordance with an embodiment.

Referring now to FIG. 3 a cross-sectional view of an air spring assembly 300 is shown in accordance with an embodiment. Air spring assembly 300 includes a top cap 211, a lower fork tube 101b, an upper fork tube 110b, a partial cartridge tube 216, a partial cartridge tube gas seal 213, a movable piston 215 with a piston gas seal 215a, a base 212 with a base gas seal 212a, a positive air spring volume 220, a negative air spring volume 230, a lower leg gas volume 240, and an annular gas volume 250.

The positive air spring volume 220 is at the top of the air spring and includes the area from the top cap 211 (or to the top of partial cartridge tube 216) and within partial cartridge tube 216 to piston gas seal 215a on movable piston 215. The negative air spring volume 230 includes the space below piston gas seal 215a on movable piston 215 down toward base gas seal 212a on the base 212 within partial cartridge tube 216. The lower leg gas volume 240 is defined as the space from the gas seal 236 to atmosphere at the top of lower fork tube 101b, about the exterior of upper fork tube 110b, to the bottom 268 of the air spring assembly 300.

In one embodiment, the positive air spring is the volume that is compressed as the movable piston 215 is driven upward during a compression of the fork. Thus, as the fork compresses—the positive air spring volume 220 compresses. The negative air spring volume 230 is the volume that is expanded as the movable piston 215 is driven upward during a compression of the fork. Thus, as the fork compresses—the negative air spring volume 230 expands. In one embodiment, the positive air spring volume 220 and the negative air spring volume 230 communicate at one or more position(s)/stroke(s) through an internal bypass channel.

In one embodiment, partial cartridge tube 216 can be an integral part of the fork (such as fork leg 34b of FIG. 2) or it can be a removably coupleable part that is axially added to the internals of the upper fork tube 110b. For example, the air spring could have a main piston seal on the inner diameter of upper fork tube 110b. In another embodiment, a cartridge air spring is used. In general, a cartridge air spring is completely separable from the fork leg 34b. In other words, it can be removed from the fork and it would still be an air spring. In general, the cartridge air spring is coaxial and is a cartridge that threads (or is otherwise coupled) into a fork tube of the fork.

In one embodiment, air spring assembly 300 is filled with air. However, in another embodiment, the air spring assembly 300 (or a portion thereof) could be filled with many different types of fluid, instead of air. The fluid could be one of an assortment of gasses (such as regular air, nitrogen, helium, carbon dioxide, and the like.) Similarly, the fluid could be a liquid. However, for purposes of clarity in the following discussion, the term "air spring fork" will be used as a generic term for the air spring assembly 300, which could refer to air, or to one or more of the assortments of gasses, fluid, or the like.

Figure 4A:
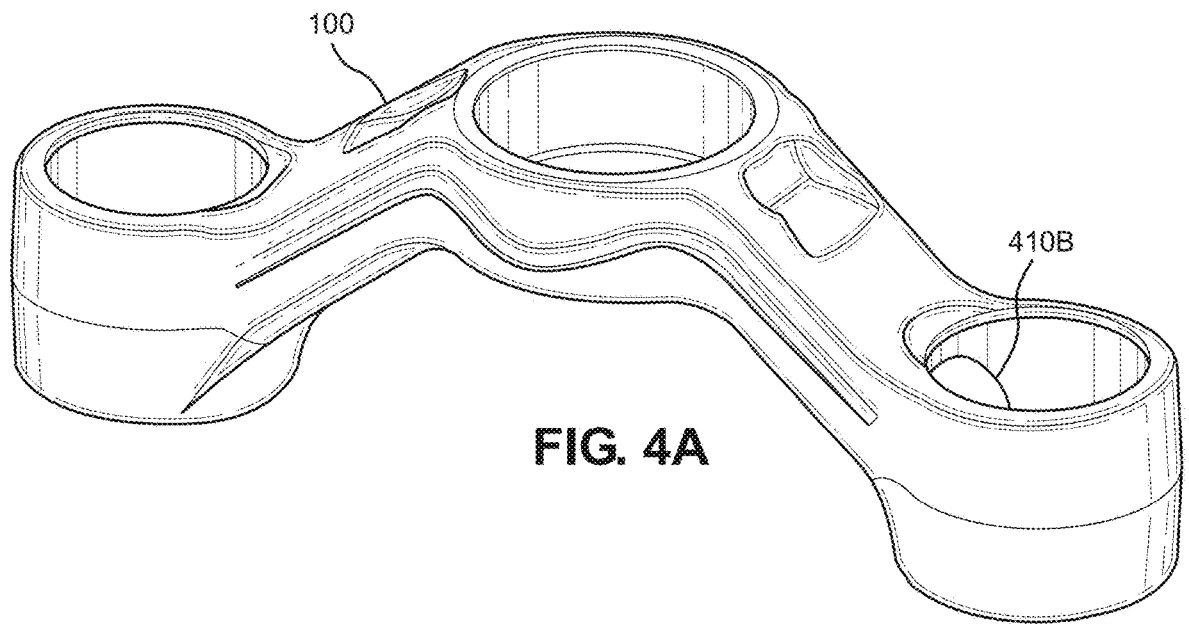
FIG. 4A is an orthogonal view of a crown with crown fluid chamber(s), in accordance with an embodiment.

Referring now to FIG. 4A, an orthogonal view of a crown 100 with one or more crown fluid chamber(s) is shown in accordance with one embodiment. In air spring forks, for example, the need for fluid volume is often limited to the available space. Thus, there is a constant compromise between the best performance fluid volume, and the available fluid volume. The following discussion utilizes a portion of crown 100 to obtain previously nonexistent fluid chambers (e.g., one or both of crown fluid chamber(s) 400a and/or 400b) for providing additional fluid volume to the upper fork tube(s).

In one embodiment, the crown fluid chamber (e.g., crown fluid chamber 400b) is formed as a cavern or bore type opening partially into crown 100, such that it only has a single fork side opening 410b. The cavern or bore type opening is be formed as part of a cast, milling, or the like used to manufacture crown 100. In one embodiment, the cavern or bore type opening is milled (or otherwise formed) after crown 100 is initially formed. In one embodiment, a lining, or the like is added to the cavern or bore type opening to form a fluid tight crown fluid chamber. In one embodiment, the material used to form crown 100 is non-porous enough to form a fluid tight crown fluid chamber 400*b*.

Figure 4B:
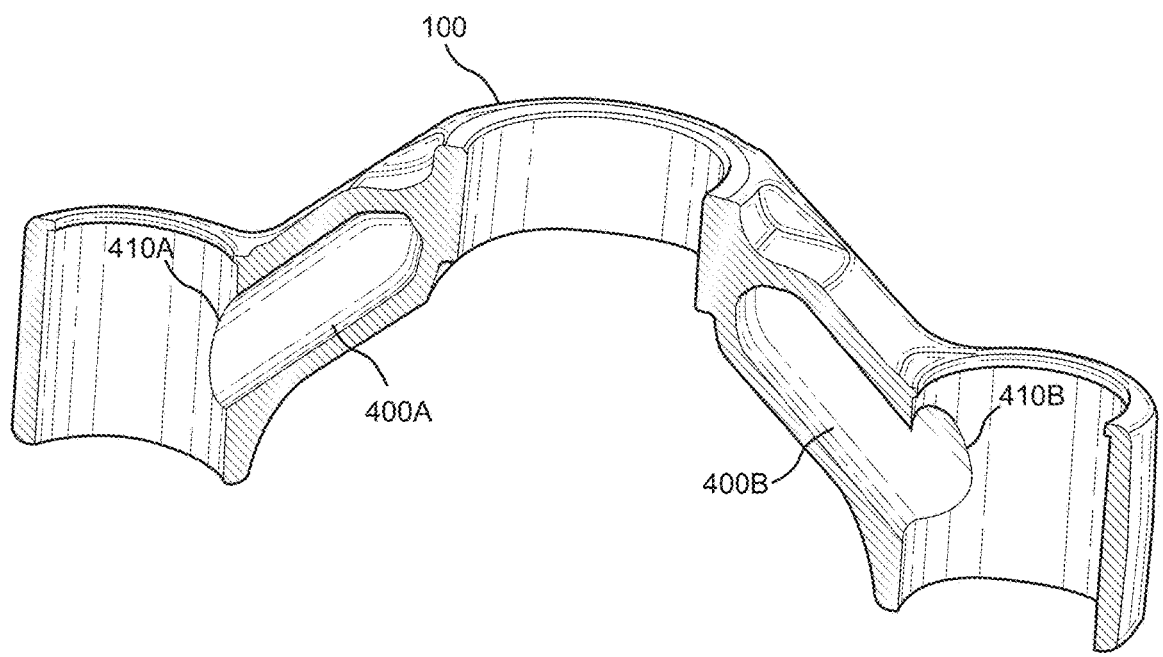
FIG. 4B is a cutaway view of a crown with one or more crown fluid chamber(s), in accordance with an embodiment.

With reference now to FIG. 4B a cutaway view of a crown 100 with crown fluid chamber 400*a* and crown fluid chamber 400*b* is shown in accordance with one embodiment. Although two fluid chambers are shown, it should be appreciated that in one embodiment, crown 100 will only have a single crown fluid chamber 400*b*. In one embodiment, crown 100 will only have a single crown fluid chamber 400*a*. In one embodiment, the crown fluid chamber 400*a* and crown fluid chamber 400*b* of crown 100 could be coupled via a fluid flow path thereby forming a single crown fluid chamber out of the combination of crown fluid chamber 400*a* and crown fluid chamber 400*b*.

With reference now to both FIGS. 4A and 4B, in one embodiment, a crown 100 is shown with a fork side opening 410*b* therein. As shown in FIG. 4B, the fork side opening 410*b* provides access to a crown fluid chamber 400*b* having a defined air volume within crown 100. Further, in one embodiment, crown 100 can also have an opening 410*a* which provides access to a crown fluid chamber 400*a* by an upper fork tube 110*a*. The crown fluid chamber 400*a* having a defined air volume within crown 100.

Figure 5A:
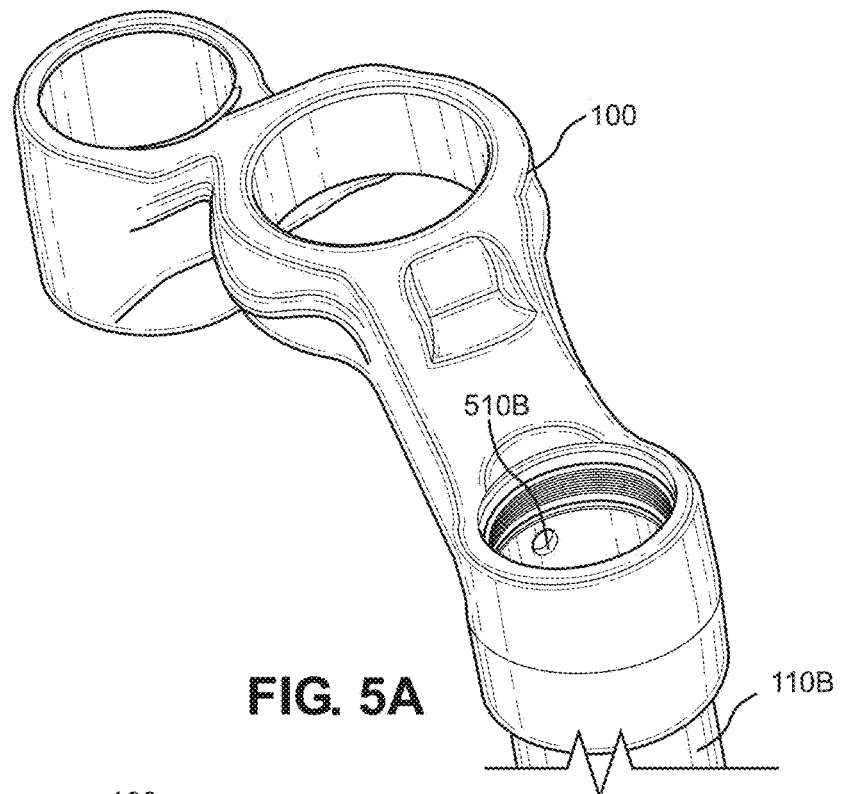
FIG. 5A is an orthogonal view of a crown with an upper fork tube, in accordance with an embodiment.
Figure 5B:
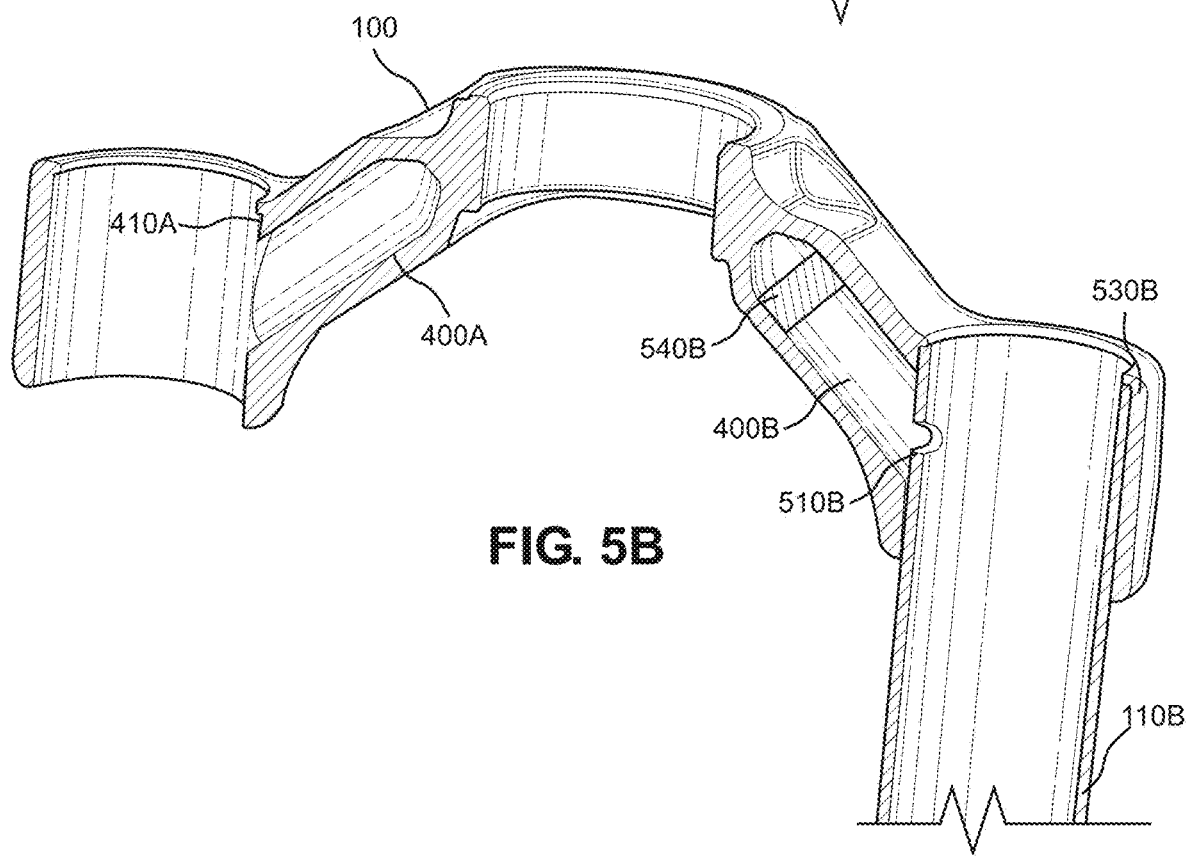
FIG. 5B is a cutaway view of a crown with an upper fork tube, in accordance with an embodiment.

Referring now to FIG. 5A, an orthogonal view of a crown 100 with an upper fork tube 110*b* is shown in accordance with one embodiment. With reference now to FIG. 5B a cutaway view of a crown 100 with an upper fork tube 110*b* is shown in accordance with one embodiment.

With reference now to both FIGS. 5A and 5B, in one embodiment, the fork side opening 410*b* in crown fluid chamber 400*b* is made available to the upper fork tube 110*b* via a port 510*b*. In one embodiment, once the upper fork tube 110*b* is installed, the crown fluid chamber 400*b* will be accessible by the upper fork tube 110*b* via port 510*b*. Although the following discussion mostly focuses on fork leg 34*b*, unless otherwise stated, it is for purposes of clarity and it should be appreciated that similar openings, ports, alignment, manufacture, assembly, and the like could be used on either fork side (e.g., fork leg 34*a* and/or fork leg 34*b*).

In one embodiment, the upper fork tube 110*b* has a series of holes (or ports such as port 510*b*) such that the upper fork tube 110*b* can be in fluid communication with the air volume in crown fluid chamber 400*b* after installation of the upper fork tube 110*b* with the crown 100. In one embodiment, the series of holes in the upper fork tube 110*b* could consist of different sized air holes such that the upper fork tube 110*b* could be rotated (during assembly or reassembly) to provide a different orifice size for port 510*b* between upper fork tube 110*b* and fork side opening 410*b* in crown fluid chamber 400*b*.

In one embodiment, the upper fork tube 110*b* is clocked with respect to port 510*b* and/or the crown 100 is clocked with respect to the fork side opening 410*b*, such that before installation, the upper fork tube port(s) will be aligned with fork side opening(s). As such, once upper fork tube 110*b* is fixedly coupled with crown 100, there will be fluid communication between upper fork tube 110*b* and crown fluid chamber 400*b*. In one embodiment, the clocking is a mark (such as an alignment mark) on the upper fork tube 110*b*, the crown 100, or both the upper fork tube 110*b* and crown 100. In one embodiment, the clocking is a tab on the outer diameter (OD) of the upper fork tube 110*b* and/or a corresponding alignment groove in an inner diameter (ID) of the fork tube opening of crown 100.

In one embodiment, there are one or more hermetic seals 530*b* used when crown 100 and upper fork tube 110*b* are coupled during the assembly process (e.g., press fit, 3D printed, or the like) to ensure that there is no fluid loss or leakage between the crown air volume in crown fluid chamber 400*b* and the upper fork tube 110*b*. In one embodiment, there may be a volume spacer 540*b* in the crown 100 crown fluid chamber 400*b* to allow a volume sizing capability for the volume of crown fluid chamber 400*b*. Although a volume spacer 540*b* is shown, in one embodiment, a bladder or other size modifiable spacing device may be used in crown fluid chamber 400*b* to allow a volume sizing capability for the volume of crown fluid chamber 400*b*. In one embodiment, if there is a bladder or other size modifiable spacing device, there will also be a bladder valve (or the like) accessible via an exterior portion of the crown to modify the size thereof.

In one embodiment, coupling the fluid volume of the crown fluid chamber 400*b* to the upper fork tube 110*b* will provide an effective increase in volume that would be similar to the volume found in an approximately 10 mm longer upper fork tube 110*b*. Thus, in one embodiment, the crown fluid chamber 400*b* allows for a reduction in the length of upper fork tube 110*b* without reducing performance (e.g., using the 10 mm example, the upper fork tube could be 10 mm shorter). In one embodiment, the crown fluid chamber 400*b* allows for a significant increase in performance using the same length of upper fork tube 110*b* having access to crown fluid chamber 400*b*. In one embodiment, the crown fluid chamber allows for both an increase in performance while also using a somewhat reduced length upper fork tube 110*b* (e.g., using the 10 mm example, the upper fork tube could be 5 mm shorter).

Although, one embodiment describes the crown fluid chamber 400*b* as adding a fluid volume that would be similar to a 10 mm longer tube, in one embodiment, the volume of the crown fluid chamber is adjustable depending upon the size of crown fluid chamber 400*b*, any spacers therein, whether it is coupled with crown fluid chamber 400*a*, or if there are additional fluid chamber available such as the steerer tube 60 fluid chamber as shown in FIG. 5E.

One embodiment, as shown in FIGS. 4B and 5B, couples the air spring side of the upper fork tube 110*b* with the crown fluid chamber 400*b* on the air spring side. In another embodiment, as shown in FIGS. 4B and 5B, the air spring side of upper fork tube 110*b* is fluidly coupled to the crown fluid chamber 400*b* on the air spring side and the crown fluid chamber 400*a* is fluidly coupled to the upper fork tube 110*a* on the damper side.

In one embodiment, the crown fluid chamber 400*a* and crown fluid chamber 400*b* are fluidly connected and the system can use air spring pressure from upper fork tube 110*b* to pressurize the damper in upper fork tube 110*a*.

In one embodiment, when both sides of crown fluid chamber 400*a* and crown fluid chamber 400*b* of crown 100 are in some type of fluid communication, as the air spring pressure is increased in upper fork tube 110*b*, it would increase the pressure on the other upper fork tube 110*b* to provide increased damping pressure, and vise-versa.

Figure 5C:
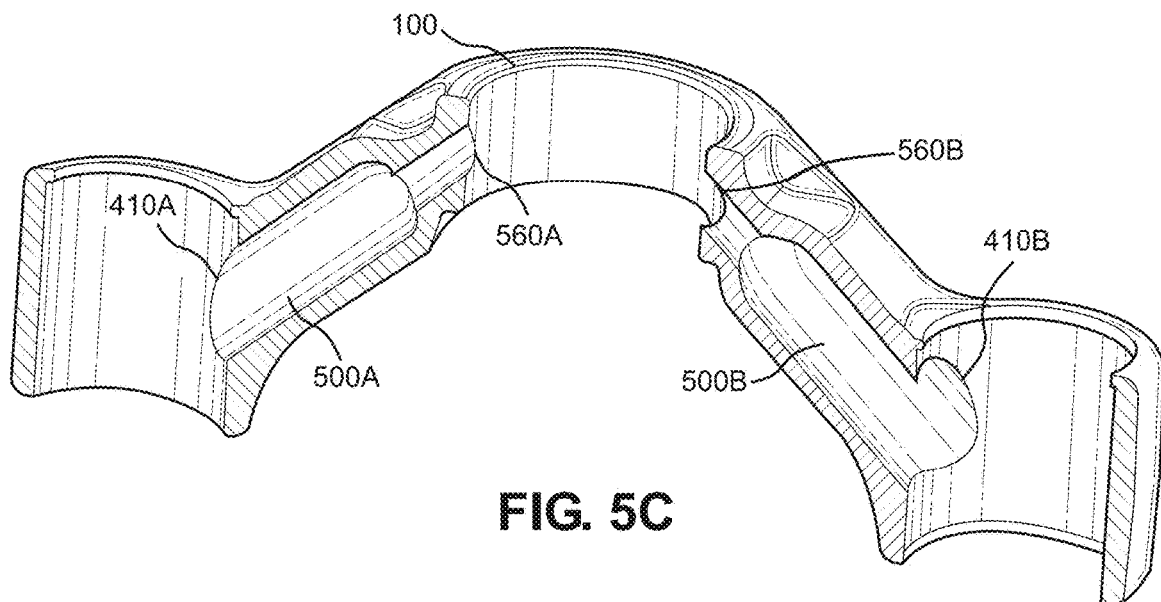
FIG. 5C is a cutaway view of a crown with one or more crown fluid holes, in accordance with an embodiment.

Referring now to FIG. 5C, a cutaway view of a crown 100 with one or more crown fluid holes is show in accordance with an embodiment. In the discussion of FIGS. 4A-5B, the fluid chamber (e.g., crown fluid chamber 400*b* and/or crown fluid chamber 400*a*) were formed as a cavern or bore type opening partially into crown 100, such that the chamber only has a single fork side opening 410*b*.

Figure 5D:
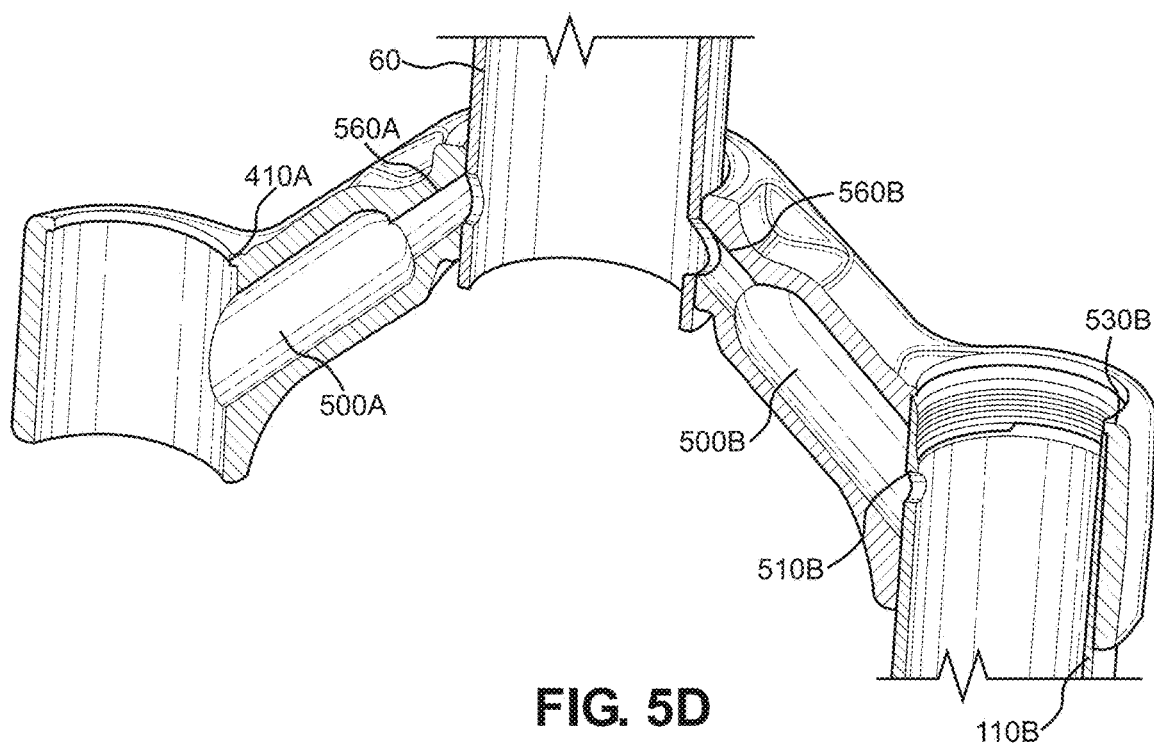
FIG. 5D is a cutaway view of a crown with one or more crown fluid holes coupled with an upper fork tube and a steerer tube, in accordance with an embodiment.

In contrast, in FIGS. 5C-5E, the fluid chamber (e.g., crown fluid chamber 500*b* and/or crown fluid chamber 500*a*) were formed as through hole that passes through an arm of crown 100, such that the fluid chamber 500*b* has a fork side opening 410*b* as well as a steerer tube side opening 560*b*. Similarly, the fluid chamber 500*a* has a fork side opening 410*a* as well as a steerer tube side opening 560*a*.

Although two fluid chambers are shown, it should be appreciated that in one embodiment, crown 100 will only have a single crown fluid chamber 500*b*. In one embodiment, crown 100 will only have a single crown fluid chamber 500*a*. In one embodiment, crown 100 will have both crown fluid chamber 500*a* and crown fluid chamber 500*b*.

In one embodiment, the tunnel, bore hole, or the like, is formed as part of a cast, milling, or other process used to manufacture crown 100. In one embodiment, the tunnel, bore hole, or the like is milled, drilled, or otherwise formed, as a second step, e.g., after crown 100 is initially formed. In one embodiment, a lining, or the like is added to the through hole to form a fluid tight internal air chamber. In one embodiment, the material used to form crown 100 is non-porous enough to form a fluid tight crown fluid chamber 500*b*.

With reference now to FIG. 5D, a cutaway view of crown 100 with crown fluid chamber 500*b* coupled with an upper fork tube 110*b* and a steerer tube 60 is shown in accordance with an embodiment.

In one embodiment, the through bore crown fluid chamber 500*b* is sealed on one side (e.g., steerer tube side opening 560*b*) by the installation of steerer tube 60. In one embodiment, the through bore crown fluid chamber 500*a* is sealed on one side (e.g., steerer tube side opening 560*a*) by the installation of steerer tube 60.

In one embodiment, the steerer tube is pressed into the crown 100 during manufacture of the fork assembly, causing the sealing of both steerer tube side opening 560*a* and steerer tube side opening 560*b*. In one embodiment, once the steerer tube 60 is installed, the crown fluid chamber 500*b* and/or crown fluid chamber 500*a* will be similar to crown fluid chamber 400*a* and crown fluid chamber 400*b* and will operate as such.

Referring now to FIG. 5E, a cutaway view of crown 100 with crown fluid chamber 500*b* coupled with an upper fork tube 110*b*, crown fluid chamber 500*a* coupled with upper fork tube 110*a*, and a steerer tube 60 with a steerer tube fluid chamber 580 therein is shown in accordance with an embodiment.

In one embodiment, instead of steerer tube 60 being used to seal both of steerer tube side opening 560*a* of crown fluid chamber 500*a* and steerer tube side opening 560*b* of crown fluid chamber 500*b*, some, part, or all of steerer tube 60 includes a steerer tube fluid chamber 580. In one embodiment, steerer tube fluid chamber 580 could be a circular chamber about the ID of steerer tube 60 such that steerer tube 60 has an axial opening 581 through a middle thereof.

In one embodiment, the steerer tube 60 has one or more steerer tube port 570*a* and/or steerer tube port 570*a*. In one embodiment, the steerer tube side opening 560*b* in crown fluid chamber 500*b* is made available to the steerer tube fluid chamber 580 via a steerer tube port 570*b*. In one embodiment, once the steerer tube 60 is installed, the crown fluid chamber 500*b* will be accessible to the steerer tube fluid chamber 580 via steerer tube port 570*b*. Although the following discussion uses the crown fluid chamber 500*b* side of the crown 100, unless otherwise stated, it is for purposes of clarity and it should be appreciated that similar openings, ports, alignment, manufacture, assembly, and the like could be used on either arm of crown 100.

In one embodiment, steerer tube 60 has a series of holes (or ports) such that the steerer tube fluid chamber 580 can be in fluid communication with the air volume in crown fluid chamber 500*b* after installation of steerer tube 60 with the crown 100. In one embodiment, the series of holes in steerer tube 60 could consist of different sized holes such that the steerer tube 60 could be rotated (during assembly or reassembly) to provide a different orifice size for steerer tube port 570*b*.

In one embodiment, steerer tube 60 is clocked with respect to steerer tube port 570*a* and/or steerer tube port 570*b*. Similarly, in one embodiment, crown 100 is clocked with respect to the steerer tube side opening 560*a* and/or steerer tube side opening 560*b*, such that before installation, the steerer tube port(s) will be aligned with the steerer tube side opening(s). As such, once the steerer tube 60 is fixedly coupled with crown 100, there will be fluid communication between steerer tube fluid chamber 580 and one or both of the crown fluid chamber 500*a* and/or crown fluid chamber 500*b*. In one embodiment, the clocking is a mark (such as an alignment mark) on the steerer tube 60, the crown 100, or both the steerer tube 60 and crown 100. In one embodiment, the clocking is a tab on the outer diameter (OD) of the steerer tube 60 and/or a corresponding alignment groove in an inner diameter (ID) of the steerer tube opening in crown 100.

In one embodiment, there are one or more hermetic seals used when crown 100 and steerer tube 60 are coupled during the assembly process (e.g., press fit, 3D printed, or the like) to ensure that there is no fluid loss or leakage between the crown air volume in crown fluid chamber 500*b* and the steerer tube fluid chamber 580. In one embodiment, there may be a volume spacer, bladder or other size modifiable spacing device, used in steerer tube fluid chamber 580 to allow a volume sizing capability for the volume of steerer tube fluid chamber 580. In one embodiment, if there is a bladder or other size modifiable spacing device, there will also be a bladder valve (or the like) accessible via an exterior portion of the steerer tube 60 and/or crown 100 to modify the size thereof.

In one embodiment, coupling the fluid volume of the crown fluid chamber 500*b* with the steerer tube fluid chamber 580, and the upper fork tube 110*b* will provide an even larger effective increase in volume than the volume of only crown fluid chamber 500*b* and upper fork tube 110*b*. As such, in one embodiment, the additional fluid volume will allow for a reduction in the length of upper fork tube 110*b* without reducing performance, a significant increase in performance using the same length of upper fork tube 110*b*, or both an increase in performance while also using a somewhat reduced length upper fork tube 110*b*.

Referring now to FIG. 6A, a side view of crown 100 with a switch 610 including a moveable switch portion 620 is shown in accordance with an embodiment. Referring now to FIG. 6B, an orthogonal cutaway view of a crown 100 with a switch 610 is shown in accordance with one embodiment. With reference now to FIG. 6C, a top cutaway view of a crown 100 with a switch 610 is shown in accordance with one embodiment.

In one embodiment, FIG. 6B includes a crown 100, upper fork tube 110*b*, crown fluid chamber 400*b*, port 510*b*, and a switch 610. In one embodiment, switch 610 includes a fluid pathway 630 and a moveable switch portion 620.

In one embodiment, fluid pathway 630 connects crown fluid chamber 400*b* with port 510*b* of upper fork tube 110*b* to provide a controlled fluid connection therebetween. In one embodiment, moveable switch portion 620 is used to automatically and/or manually open or close fluid flow via fluid pathway 630. In so doing, a rider can control the amount of air volume available to upper fork tube 110b and thus air spring assembly 300. Thus, in one embodiment, fluid pathway 630 ports the air spring side of the upper fork tube 110b to the crown volume on the air spring side through a selectable switch, so the crown volume acts as a crown fluid chamber 400b. In one embodiment, the switch could be a manual switch, an electronic switch, or the like.

In one embodiment, instead of simply opening or closing fluid pathway 630, moveable switch portion 620 of switch 610 can be used to partially obstruct (e.g., partially open, partially close, etc.) fluid pathway 630 to control the flow rate of the fluid passing therethrough. In so doing, the switch 610 would act in a similar manner as the different sized ports discussed herein. Thus, depending upon the position of moveable switch portion 620 with respect to fluid pathway 630, the air spring could have free access, limited access, or no access to the volume of crown fluid chamber 400b. Such control could be used by a rider to provide damping and or rebound modification to the air spring performance.

Although only one side of crown 100 is shown, in one embodiment, a switch is provided in the fluid pathway that connects crown fluid chamber 400a with port 510a of upper fork tube 110b to provide a controlled fluid connection therebetween. In one embodiment, a plurality of switches can be provided between any/all of the defined volumes to add external adjustment to the total air volume.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the Claims.

Reference throughout this document to "one embodiment," "certain embodiments," "an embodiment," "various embodiments," "some embodiments," or similar term, means that a particular feature, structure, or characteristic described in connection with that embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A fork assembly comprising:
a crown, said crown comprising:
   at least one crown fluid chamber having a first fluid volume;
at least one fork leg fixedly coupled with said crown, said at least one fork leg comprising:
   a lower fork tube; and
   an upper fork tube telescopically coupled with said lower fork tube, said upper fork tube comprising at least one fork fluid chamber having a second fluid volume, said at least one fork fluid chamber fluidically coupled with said at least one crown fluid chamber; and
a hermetic seal to provide a fluid seal between said at least one crown fluid chamber and said at least one fork fluid chamber.

2. The fork assembly of claim 1 further comprising:
a switch, said switch configured to control a fluid flow between said at least one crown fluid chamber and said at least one fork fluid chamber.

3. The fork assembly of claim 2 wherein said switch is an adjustable switch configured to provide an adjustable flow rate for said fluid flow between said at least one crown fluid chamber and said at least one fork fluid chamber.

4. The fork assembly of claim 2 wherein said switch is selected from the group consisting of: a manual switch and an electric switch.

5. The fork assembly of claim 1 further comprising:
an alignment mark, said alignment mark used to align said at least one fork leg with said crown.

6. The fork assembly of claim 1 further comprising:
a volume spacer configured to be disposed within said at least one crown fluid chamber, said volume spacer providing a volume change to said first fluid volume.

7. The fork assembly of claim 1 further comprising:
an adjustable bladder configured to be disposed within said at least one crown fluid chamber, said adjustable bladder providing a volume adjustment capability of said first fluid volume.

8. A fork assembly comprising:
a crown, said crown comprising:
   at least one crown fluid chamber having a first fluid volume;
at least one fork leg fixedly coupled with said crown, said at least one fork leg comprising:
   a lower fork tube; and
   an upper fork tube telescopically coupled with said lower fork tube, said lower fork tube and said upper fork tube forming at least one fork fluid chamber having a second fluid volume, said at least one fork fluid chamber fluidically coupled and hermetically sealed with said at least one crown fluid chamber; and
a switch, said switch configured to control a fluid flow between said at least one crown fluid chamber and said at least one fork fluid chamber.

9. The fork assembly of claim 8 wherein said switch is an adjustable switch configured to provide an adjustable flow rate for said fluid flow between said at least one crown fluid chamber and said at least one fork fluid chamber.

10. The fork assembly of claim 8 wherein said switch is selected from the group consisting of: a manual switch and an electric switch.

11. The fork assembly of claim 8 further comprising:
an alignment mark, said alignment mark used to align said at least one fork leg with said crown.

12. The fork assembly of claim 8 further comprising:
a volume spacer configured to be disposed within said at least one crown fluid chamber, said volume spacer providing a volume change to said first fluid volume.

13. The fork assembly of claim 8 further comprising:
an adjustable bladder configured to be disposed within said at least one crown fluid chamber, said adjustable bladder providing a volume adjustment capability of said first fluid volume.

14. A fork assembly comprising:
a crown, said crown comprising:
   a first crown fluid chamber having a first fluid volume; and a second crown fluid chamber having a second fluid volume;

at least one fork leg fixedly coupled with said crown, said at least one fork leg comprising:

a lower fork tube; and an upper fork tube telescopically coupled with said lower fork tube, said lower fork tube and said upper fork tube forming at least one fork fluid chamber having a third fluid volume, said at least one fork fluid chamber fluidically coupled with said first crown fluid chamber and said second crown fluid chamber; and a hermetic seal to provide a fluid seal between said first crown fluid chamber, said second crown fluid chamber and said at least one fork fluid chamber.

15. The fork assembly of claim 14 further comprising:

a switch, said switch configured to control a fluid flow between said first crown fluid chamber and said at least one fork fluid chamber.

16. The fork assembly of claim 14 further comprising:

a switch, said switch configured to control a fluid flow between said second crown fluid chamber and said at least one fork fluid chamber.

17. The fork assembly of claim 15 wherein said switch is an adjustable switch configured to provide an adjustable flow rate for said fluid flow between said first crown fluid chamber and said at least one fork fluid chamber.

18. The fork assembly of claim 14 further comprising:

an alignment mark, said alignment mark used to align said at least one fork leg with said crown.

\* \* \* \* \*